Aug. 23, 1966  J. A. PURSLEY  3,268,425
PROCESS FOR PREPARING HYDRAZINE
Filed May 10, 1962
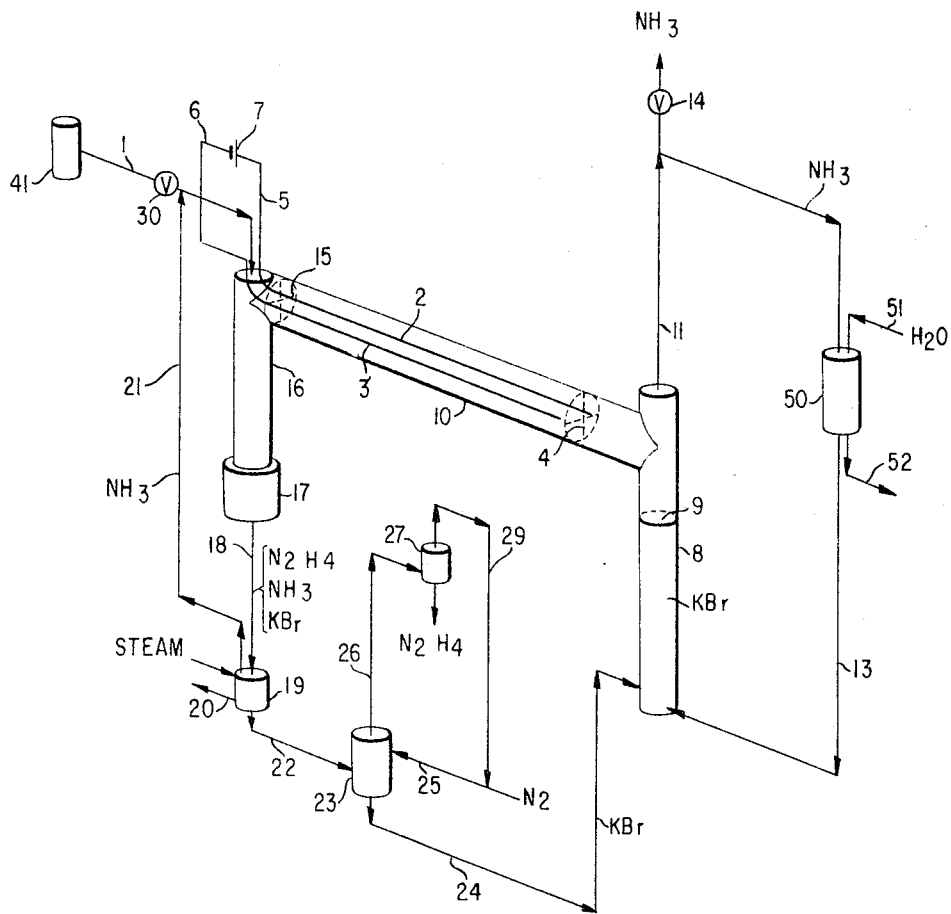
INVENTOR.
JOHN A. PURSLEY
BY
Stowe, Birch, Swindler & McKie
ATTORNEYS

# United States Patent Office 3,268,425
Patented August 23, 1966

3,268,425
PROCESS FOR PREPARING HYDRAZINE
John A. Pursley, Lock Haven, Pa. (Box 502-C, Yerba
Buena Road, R.D. 2, Malibu, Calif. 90265)
Filed May 10, 1962, Ser. No. 193,844
17 Claims. (Cl. 204—59)

This application is a continuation-in-part of applicant's copending application Serial No. 823,261, filed June 26, 1959, now U.S. Patent No. 3,034,861, which in turn is a continuation-in-part of application Serial No. 306,694, filed August 27, 1952, now abandoned.

This invention relates to a process for preparing hydrazine and more particularly to a method wherein hydrazine is prepared in an electrolytic method.

Hydrazine has found rather widespread utility in recent years. It has been found to be useful as a rocket fuel, a curing agent for synthetic elastomers such as the polyurethanes, and as an intermediate for valuable specialty chemicals such as B-hydroxy naphthalazine, a brilliant fluorescent yellow pigment.

In spite of its usefulness since hydrazine was first isolated by Curtius in 1887 (Ber. 20, 1632), methods have not yet been devised which are suitably adapted for its production on a commercial scale. Of the available methods, perhaps the best known is the Raschig method, described in U.S. Patent No. 910,858 and in J. Am. Chem. Soc. 73, 1619 (1951). In accordance with the Raschig method, sodium hypochlorite is reacted with ammonia at a fairly rapid rate to form chloramine, the exact reaction being given by the following chemical equation:

$$NaOCl + NH_3 \rightarrow NH_2Cl + NaOH \qquad (1)$$

Reaction 1 is carried out in the presence of excess ammonia which then reacts with the chloramine and sodium hydroxide formed therein to given hydrazine in accordance with the following chemical equation:

$$NH_2Cl + NH_3 + NaOH \rightarrow H_2N-NH_2 + NaCl + H_2O \qquad (2)$$

Reaction 2 however, is a relatively slow one and it competes with a third reaction with the result that the yield of hydrazine is undesirably reduced.

The competing third reaction can be represented by the following equation:

$$2NH_2Cl + H_2N-NH_2 \rightarrow 2NH_4Cl + N_2 \qquad (3)$$

In accordance with the present invention a new process for preparing hydrazine is provided which has a higher reaction rate for the synthesis step than processes heretofore available.

Accordingly, it is the primary object of the present invention to provide a more reliable process for preparing hydrazine at substantially increased yields as compared to prior art methods therefor.

It is an additional object of the present invention to provide a method for preparing hydrazine which is particularly adapted for utilization in commercial scale operations.

It is another object of the present invention to provide a method for preparing hydrazine wherein raw material and operating expenditures are significantly lower than those observed in conventional processes therefor.

It is a particular object of the present invention to provide a method for preparing hydrazine wherein ammonia, a relatively inexpensive material, is essentially the only raw material used up in a synthesis capable of operating continuously at commercially economic levels.

In accordance with my new process, I prepare hydrazine by reacting at least one haloamine with at least one amide of a metal selected from the group consisting of Group IA metals and Group IIA metals. The classification of the metals herein referred to is the periodic classification of elements according to Deming. A copy of the Deming Periodic Table appears at page 314 of the Handbook of Chemistry and Physics, 27th edition, published by Chemical Rubber Publishing Company in 1943.

In the process of the invention the reactants employed, haloamines and metal amides, are formed in an electrolytic cell in which a non-aqueous solution comprising ammonia and a metal halide is subject to direct current electrolysis. In the electrolysis, free metal and free halogen initially are produced from the metal halide salt which is in a ionized form due to the presence of ammonia in the non-aqueous solution. The free metal and halogen thereby formed each reacts with the ammonia to produce a metal amide and haloamine, respectively, and these intermediates in turn then react with each other to provide hydrazine and regenerate the metal halide salt supply. The series of reactions involved in the method of the invention are demonstrated by the following set of reactions wherein the M represents a Group IA metal, X a halogen, and N and H are the conventional symbols for nitrogen and hydrogen, respectively:

$$MX \xrightarrow{NH_3} \overset{+}{M} + \overset{-}{X} \qquad (4)$$

$$\overset{+}{M} + \overset{-}{e} \longrightarrow M \qquad (5)$$

$$\overset{-}{X} \longrightarrow X + \overset{-}{e} \qquad (6)$$

$$M + NH_3 \rightarrow MNH_2 + 1/2 H_2 \qquad (7)$$
$$2X \rightarrow X_2 \qquad (8)$$
$$X_2 + NH_3 \rightarrow XNH_2 + HX \qquad (9)$$
$$MNH_2 + XNH_2 \rightarrow NH_2-NH_2 + MX \qquad (10)$$

The metal halides contemplated for utilization in the method of the present invention suitably may be the chloride, bromide, iodide, or fluoride of any of the Group IIA or Group IA metals. Of the Group IA metals, more commonly known as the alkali metals, sodium, potassium, cesium and rubidium halides provide the more preferred salts. With respect to the Group IIA metals, e.g., alkaline earth metals, strontium and barium form the preferred halides. Due to their increased solubility in ammonia, Group IA metal salts are more advantageously adapted for use in the present method than the Group IIA metal halides with the bromides of sodium and potassium constituting the more preferred embodiments of the metal halides.

Although nonaqueous medias such as diethyl ether, formamide, dimethylformamide, and the like containing ammonia dissolved therein suitably may be employed in the method of the present invention, preferably the bath employed in the electrolytic process of the present invention is a solution of the metal halide in liquid ammonia. The electrolytic process of the present invention suitably can be carried out at any convenient temperature and pressure. In order to reduce the vaporization of ammonia in the bath, however, the temperature and pressure conditions preferably are adjusted to be at or below the dew point of ammonia. Examples of the vapor pressures of ammonia are about 15 p.s.i.a. at −33.5° C. and about 140 p.s.i.a. at 20° C. Usually temperatures in the range of from about −50° to about +75° C. are employed.

During the electrolysis carried out in accordance with the present invention, the metal amide is formed at the cathode of the electrolytic cell and the haloamine is formed at the anode. Since hydrazine forming near the anode would be decomposed, preferably the cathodic and anodic portions of the cell are separated by a diaphragm.

Although hydrazine may be recovered from the bath when the electrolysis is conducted as described above, preferably in order to minimize the proportion of hydrazine decomposed in the cell, portions of the electrolytic solution containing the metal amide and haloamine are removed from the regions of the cathode and anode, respectively, and combined in a separate chamber wherein Reaction 10, described above, occurs and hydrazine is formed.

In the chamber wherein hydrazine is formed metal halide and unreacted ammonia are also present. Hydrazine may be recovered from such a mixture by any suitable method such as electrodialysis, evaporation, ion exchange, adsorption and the like. The final product is anhydrous hydrazine and the by-product metal halide and unreacted ammonia are returned to the reaction system.

In accordance with the preferred embodiment of the method of the invention, the mixture of reaction products obtained in the electrolytic cell and containing hydrazine are slightly warmed initially to effect evaporation of essentially all of the ammonia therefrom. The resulting ammonia vapors are then returned to the electrolytic cell, preferably maintained at or below the dew point of ammonia, whereby the vapors are condensed and reintroduced into the electrolytic bath.

Hydrazine is then separated from the anhydrous residue which contains metal halide and hydrazine and remains after the evaporation of ammonia, by heating the residue gently while passing a small stream of dry nitrogen thereover. The nitrogen serves to strip out hydrazine vapor. The hydrazine then can be separated from the resulting hydrazine-nitrogen gas mixture by passing the mixture over a cold surface, such as is provided by a closed glass tube which is submerged, save for the topmost portion, in ice water. The hydrazine condenses from the gas mixture, and the nitrogen gas vents off. The hydrazine condensate does not freeze in the condenser trap owing to small concentrations of ammonia which are present and which depress the melting point of hydrazine which melts at 1.4° C. Upon heating the condensate in the tube, such as by immersing the bottom thereof in a mineral oil bath, the hydrazine condensate vaporizes and condenses on the cooler upper regions of the tube where it can be collected in purer form.

The metal halide remaining in the residue after the removal of ammonia and the hydrazine therefrom is then recycled to the electrolytic bath for reutilization in the system. Thus, the metal halide employed in the preparation of hydrazine in accordance with the present invention is continuously regenerated in the process and the raw material expenditures attendant the use of the halide salts are merely those required to provide the initial baths.

The method of the present invention having been generally described above, the following examples are presented to illustrate specific embodiments thereof and are not given by way of limitation. The examples will be more fully understood by reference to the accompanying drawing which represents one form of apparatus in which the present method suitably may be carried out.

*Example I*

A salt reservoir 8 was initially filled to a level 9 with potassium bromide. The complete system was then purged with ammonia vapor introduced thereinto from tank 40 through an inlet valve 30 and exiting therefrom through purge valve 14. Purge valve 14 was then closed and the pressure in the system allowed to build up at room temperature to be in equilibrium with that of tank 40 or about 125 p.s.i.g. Cold water was circulated through condenser 50 by means of lines 51 and 52 to effect the condensation of ammonia in the system. The condensation was allowed to continue until salt reservoir 8, an electrode chamber 10 and an evaporator 16 were filled with liquid ammonia. Electrode chamber 10 was adapted at the end opposite reservoir 8 with a weir 15 which maintained the level of the bath at a predetermined height and when full caused liquid to spill over into evaporator 16 upon the condensation of additional ammonia.

Heat was applied to the liquid in evaporator 16 by means of a heater 17 located at the bottom thereof. In evaporator 16 ammonia was vaporized and passed through the space above the liquid in electrode chamber 10 and line 11 to a condenser 50. In condenser 50 the ammonia vapor was caused to liquify and recycled to salt reservoir 8 via line 13. Inlet valve 30 and purge valve 14 were then adjusted until the amount of ammonia vented through valve 14 was about 20 cc. per minute and the level of liquid in evaporator 16 remained essentially constant.

Electrode chamber 10 was provided with a carbon anode 2, an iron cathode 3, and a fiber glass diaphragm 4 which was located between the electrodes.

Direct current was then passed through the bath and the metal halide electrolyzed by applying a voltage across anode 2 and cathode 3 by means of a D.C. source 7. At equilibrium conditions the voltage applied was 6 volts and the current 0.42 amp.

During the electrolysis the continuous recycling of condensed ammonia to salt reservoir 8 caused the level of liquid in electrode chamber 10 to be at such a level that liquids from the anodic and cathodic area of the cell continuously spilled over weir 15 into evaporator 16 and were mixed with the formation of hydrazine and potassium bromide therein. In evaporator 16 unreacted ammonia was continuously evaporated from the liquid therein by the application thereto of heat from evaporator heater 17 as above described. Residual liquid containing potassium bromide and hydrazine was drawn off from the bottom of evaporator 16 by means of line 18 and passed to an ammonia separator 19 wherein any remaining ammonia was removed by indirect heating with steam passed through jacket 20. The residue containing hydrazine and potassium bromide was then recovered from separator 20 and passed to a hydrazine stripper 23 by means of line 22. In hydrazine stripper 23 hydrazine was stripped from the residue by means of dry nitrogen introduced thereinto through line 25 and the nitrogen-hydrazine gas mixture exited through line 26. Potassium bromide remained in stripper 23 and was then recycled to salt reservoir 8 via line 24. The hydrazine-nitrogen vapor mixture from stripper 23 was then sent to collector 27 by means of line 26 wherein hydrazine was selectively condensed by contacting the cool surfaces thereof. Nitrogen from which the hydrazine had been removed was recycled to stripper 23 through line 28.

The condensate obtained in collector 27 was analyzed for hydrazine by initially dissolving it in 50 cc. of water and acidifying the resulting solution with a few drops of hydrochloric acid. About 5 cc. of the solution were then added to 100 cc. of hot methanol containing B-hydroxy naphthaldehyde. The precipitate which formed exhibited the characteristic yellow fluorescence of B-hydroxy naphthalazine, thus confirming the presence of hydrazine in the product obtained.

*Example II*

The procedure of Example I was repeated with the exceptions of substituting each in turn sodium bromide, sodium chloride, potassium chloride, potassium fluoride, sodium iodide, magnesium chloride, and barium bromide for potassium bromide.

The test described in Example I confirmed in each case the presence of hydrazine in the product obtained in collector 27.

Although the above examples are limited to the use of carbon and iron as the anode and cathode, respectively, it will of course be understood that other materials which are conventionally employed as electrodes in electrolytic cells and which are inert with respect to the constituents in the bath suitably may be employed in the method of the invention. The term "inert" as employed herein is meant to refer to those materials employed as electrodes which are not altered chemically or physically by the constituents in the electrolytic bath. Hence, materials which exert catalytic influences upon the desired reactions in the cell suitably may be employed. For example, the iron cathode employed in the examples acts as a catalyst for Reaction 7, described above, wherein the metal amide is formed.

It will be understood that inert materials which act as catalysts for the desired reactions carried out in the present method also suitably may be present in the bath in forms other than the electrodes. For example, an uncharged iron wire satisfactorily could be immersed in the electrolytic bath adjacent to the cathode.

In accordance with the method of the present invention the diaphragm suitably may be formed of materials other than fiber glass, the one specifically identified in the above examples. Such suitable materials are those commonly employed in forming diaphragms including those which hinder the migration of ions through the electrolytic bath by physical means and/or by permselective action.

Although variations and modifications of the method of the present invention will be apparent from the general description and specific embodiments thereof given in the specification, it is intended that the present invention be limited only by the scope of the appended claims.

What is claimed is:

1. The process for preparing hydrazine comprising the steps of:
   (a) preparing a non-aqueous electrolyte comprising ammonia and a halide of a metal selected from the the group consisting of Group IA metals and Group IIA metals;
   (b) subjecting said electrolyte to direct current electrolysis with inert electrodes; and
   (c) recovering hydrazine formed during said electrolysis from said electrolyte.

2. The process for preparing hydrazine according to claim 1 wherein said halide is a Group IA metal halide.

3. The process for preparing hydrazine according to claim 1 wherein said halide is a Group IIA metal halide.

4. The process for preparing hydrazine according to claim 1 wherein said electrolysis is carried out in an electrolytic cell provided with means dividing said bath into anodic and cathodic chambers, portions of said bath are withdrawn from each of said anodic and cathodic chambers of said cell and said withdrawn bath portions are then combined in a separate zone.

5. A process for preparing hydrazine wherein a non-aqueous bath comprising a solution of at least one Group IA metal halide in liquid ammonia is subjected to direct current electrolysis in an electrolytic cell provided with means dividing said bath into anodic and cathodic chambers, withdrawing portions of said bath from each of said anodic and cathodic chambers of said cell, and combining said withdrawn bath portions in a separate zone.

6. The process for preparing hydrazine according to claim 5 wherein said halide is a bromide.

7. The process for preparing hydrazine according to claim 5 wherein said halide is a chloride.

8. The process for preparing hydrazine according to claim 5 wherein said halide is a fluoride.

9. A process for preparing hydrazine wherein a non-aqueous bath comprising a solution of at least one Group IIA metal halide in liquid ammonia is subjected to direct current electrolysis in an electrolytic cell provided with means dividing said bath into anodic and cathodic chambers, withdrawing portions of said bath from each of said anodic and cathodic chambers of said cell, and combining said withdrawn bath portions in a separate zone.

10. The process for preparing hydrazine according to claim 9 wherein said halide is a bromide.

11. The process for preparing hydrazine according to claim 9 wherein said halide is a chloride.

12. The process for preparing hydrazine according to claim 9 wherein said halide is a fluoride.

13. A process in accordance with claim 1 wherein said electrolyte comprises a solution of potassium bromide in liquid ammonia.

14. A process in accordance with claim 1 wherein said electrolyte comprises a solution of potassium chloride in liquid ammonia.

15. A process in accordance with claim 1 wherein said electrolyte comprises a solution of sodium bromide in liquid ammonia.

16. A process in accordance with claim 1 wherein said electrolyte comprises a solution of sodium chloride in liquid ammonia.

17. A process in accordance with claim 1 wherein said electrolyte comprises a solution of barium chloride in liquid ammonia.

References Cited by the Examiner

UNITED STATES PATENTS

| | | | |
|---|---|---|---|
| 1,538,390 | 5/1925 | Ewan | 204—59 |
| 2,245,831 | 6/1941 | Silsby | 204—59 |
| 2,315,830 | 4/1943 | Vingee et al. | 204—59 |
| 2,813,067 | 11/1957 | Stuart | 204—59 |
| 2,841,543 | 7/1958 | Haller | 204—59 |

OTHER REFERENCES

Journal of American Chemical Society, vol. 55 (1933), pp. 3211–3214.

JOHN H. MACK, *Primary Examiner.*

JOSEPH REBOLD, *Examiner.*

B. JOHNSON, H. S. WILLIAMS,
*Assistant Examiners.*